(12) United States Patent
Fujioka et al.

(10) Patent No.: US 8,239,772 B2
(45) Date of Patent: Aug. 7, 2012

(54) APPARATUS, SYSTEM AND METHOD FOR A USER PROFILED-BASED OS FOR MOBILE DEVICES

(75) Inventors: Robb Fujioka, Manhattan Beach, CA (US); Daryl Okimoto, Cerritos, CA (US)

(73) Assignee: Fuhu Holdings, Inc., El Segundo, CA (US)

( * ) Notice: Subject to any disclaimer, the term of this patent is extended or adjusted under 35 U.S.C. 154(b) by 224 days.

(21) Appl. No.: 12/872,372

(22) Filed: Aug. 31, 2010

(65) Prior Publication Data

US 2010/0325629 A1    Dec. 23, 2010

Related U.S. Application Data

(63) Continuation-in-part of application No. 12/730,500, filed on Mar. 24, 2010.

(60) Provisional application No. 61/210,936, filed on Mar. 24, 2009.

(51) Int. Cl.
*G06F 3/00* (2006.01)

(52) U.S. Cl. ........................................ 715/745

(58) Field of Classification Search .................. 715/745, 715/774
See application file for complete search history.

(56) References Cited

U.S. PATENT DOCUMENTS

| | | | |
|---|---|---|---|
| 2004/0193802 A1* | 9/2004 | Meiri et al. .................... | 711/118 |
| 2006/0218482 A1* | 9/2006 | Ralston et al. ............. | 715/500.1 |
| 2008/0109552 A1* | 5/2008 | Tamir et al. ................... | 709/229 |

* cited by examiner

*Primary Examiner* — Omar Abdul-Ali
(74) *Attorney, Agent, or Firm* — Marc E. Hankin; Kevin Schraven; Hankin Patent Law, APC

(57) ABSTRACT

A tile bar for use in association with a graphical user interface associated with at least one operating system is disclosed. The tile bar includes a plurality of tiles indicative of one or more of an application, a file, a window, a data, and an outcome, an identifying tile among the plurality of tiles, wherein the identifying tile is uniquely indicative of at least one of a user preference and user information of a user logged in to the graphical user interface, and wherein the identifying tile is adjacent to at least one tile of the plurality of tiles, and a scroll for presenting ones of the plurality of tiles not immediately viewable to the user. The tile bar further includes each of said plurality of tiles comprises at least one of rotating about an axis, focused by a magnifying cursor, increased vividness, and blurring upon placement of a cursor provided by the graphical user interface at a predetermined proximation to each tile.

3 Claims, 20 Drawing Sheets

APPARATUS, SYSTEM AND METHOD FOR A USER PROFILED-BASED OS FOR MOBILE DEVICES

CROSS REFERENCE TO RELATED APPLICATIONS

This application is a continuation-in-part of U.S. patent application Ser. No. 12/730,500 entitled "Apparatus, System And Method For An Icon Driven Tile Bar In A Graphical User Interface" filed Mar. 24, 2010, which claims the benefit of Provisional Application Ser. No. 61/210,936, entitled "Apparatus, System And Method For An Icon Driven Tile Bar In A Graphical User Interface" filed Mar. 24, 2009, which applications are hereby incorporated by reference as if set forth in their entirety herein.

BACKGROUND OF THE INVENTION

1. Field of the Invention

The present invention relates generally to a graphical user interface (GUI) for a computing system, and, more particularly, the present invention relates to an apparatus, system and method for making available applications, including at least one foreign application, to at least one native operating system associated with the GUI.

2. Description of the Background

A graphical user interface (GUI) is a well-understood and long established mechanism whereby a user gains access to computing data, commands, applications, information, network protocols, outcomes, files, and the like. In typical embodiments, an operating system (OS) is provided in a computing system, in order to interact with the underlying hardware of the computing system and to thereby enable operation of the aforementioned data, commands, applications, information, network protocols, outcomes, and the like. Such an OS is typically provided with a GUI to enable the user to most efficiently make use of the offerings of the OS.

Currently, many OS-GUIs emulate a "desktop", wherein multiple applications, data, information, protocols, and outcomes, such as documents, pictures, and audio, files, and the like, are visually presented to the user in an identifiable and recognizable manner, such as through the use of graphical identifiers called "icons." As such, the desktop is the main display screen of a typical OS-GUI. Simply put, one or more icons is provided in an organized fashion on the screen, preferably with icons broken down into multiple, and sometimes exploding, "windows" for improved organization on the open "desktop," wherein each window may also be represented by an icon which may explode or otherwise activate, and wherein each icon indicates to the user, typically graphically, what item (or items) is represented by that icon. Icons are typically selectable using a keystroke or a mouse to activate a cursor, for example.

In certain OS-GUIs, icons may be selectively provided along only a portion of the screen, such as in order to make preferred or frequently used icons easier to find and/or execute. This is herein referred to as a "tile bar," and it may simplify use of the GUI, such as wherein multiple files or applications, typically present in separate windows, are needed to perform a task, and wherein the icons representing all such multiple files or applications may be placed in one convenient place for access, namely the tile bar. In some GUIs, such icons may be uniquely selected by each user for placement into this tile bar, such as to allow a preferred user experience upon use of the GUI. However, even in such embodiments, the tile bar is not truly personalized, at least because, although the user may select the tiles for that user's tile bar, the information accessed by each icon placed on the tile is the same for each user. Additionally, the addition of icons to the tile bar may eventually cause the tile bar to be difficult to read or to become cluttered.

Further, programmatically, the selection of an icon using a cursor typically requires a "launch," wherein the selected icon is "exploded," as discussed above, into the selected application, file, new window, or the like. This is typically the case whether an icon is selected from the desktop or from the tile bar. A "launch" generally takes unwanted time, in part because processing must be performed in order to "launch" the icon into the item to which it is to be exploded, and such a launch necessitates execution of computing code associated with the application, file or new window.

Thus, a need exists for a tile bar that alleviates issues with regard to launch of icons, personalization of the tile bar, and identification of icons on the tile bar proximate to a cursor.

BRIEF DESCRIPTION OF THE FIGURES

Understanding of the present invention will be facilitated by consideration of the following detailed description of the embodiments of the present invention taken in conjunction with the accompanying drawings, in which like numerals refer to like parts and in which.

DETAILED DESCRIPTION OF THE INVENTION

It is to be understood that the figures and descriptions of the present invention have been simplified to illustrate elements that are relevant for a clear understanding of the present invention, while eliminating, for the purposes of clarity, many other elements found in typical computing apparatuses, systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
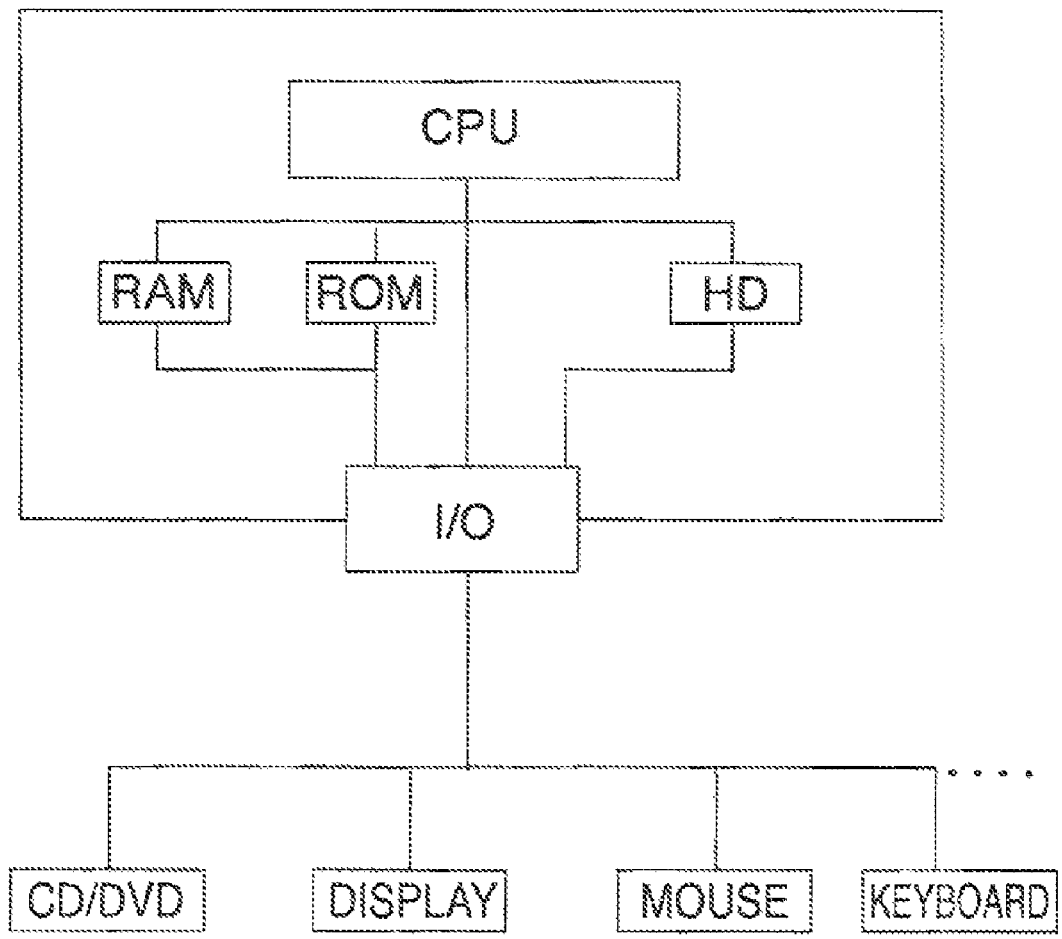
FIG. 1 is an illustration of an aspect of the present invention.

FIG. 1 illustrates a processor for performing computing functions. The processor may have associated therewith a hard disc or similar magnetic and/or mass storage device, at least one memory device, such as a ROM and a RAM, and a plurality of input/outputs, such as a disc, CD, DVD, or like drive input/output, a keyboard input, a display input/output and one or more display drivers, and a mouse input. Also, externally associated with the inputs/outputs, and thus communicating with the processor, may be a display device, a keyboard or the like, and a mouse or the like. The mouse, which as used herein includes any type of computer mouse as well as any input/output device capable of conveying user movements and/or commands to an input/output, may allow the user to effectuate movement of a cursor, or like element, within a GUI in an OS, which movement may be reflected on the display device.

Figure 2:
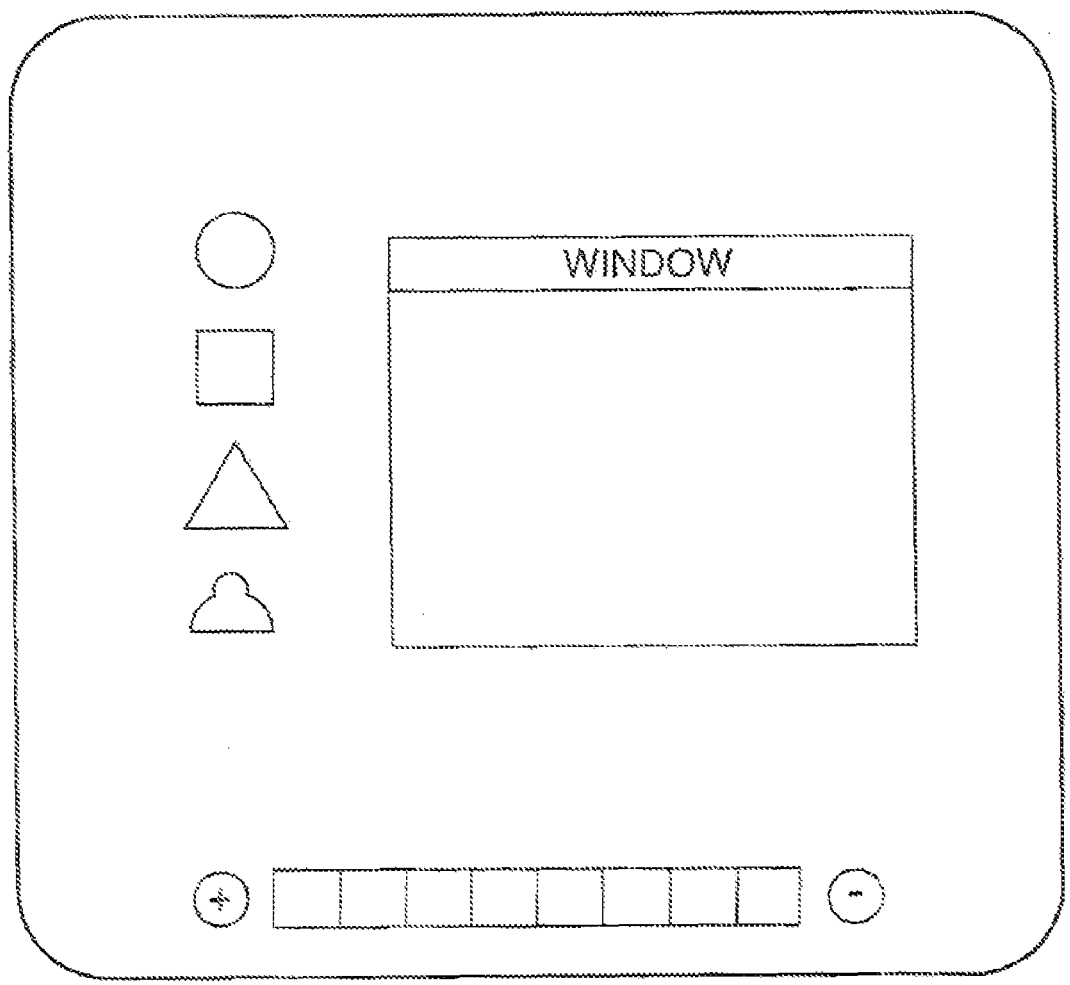
FIG. 2 is an illustration of an aspect of the present invention.

FIG. 2 illustrates such a GUI in an exemplary embodiment of the present invention. A number of icons are shown on the desktop of the GUI, and numerous icons are additionally resident on the tile bar shown in association with the desktop. The tile bar may include a number of tiles, and may include a scroll mechanism to move further tiles into view, such as arrow buttons, plus/minus buttons, sets and subsets, menu driven or otherwise or the like, to move new icons into view from up or down, or left or right, dependent upon the location of the tile bar in relation to the desktop. For example, the tile bar, as illustrated, is at the bottom portion of the display, with plus/minus buttons at the right and left of the tile bar to allow a user to scroll to the right or left to view additional icons in the tile bar.

The icons in the tile bar may be selected by the operating system, and/or may be selected, in whole or in part, by the user. For example, the tile bar may include icons placed in the tile bar by the user, and/or may include icons representative of applications currently active, certain of which active-application icons may be placed onto the tile bar automatically by the OS, and removed by the OS when not in use. The user may select those icons for inclusion on the tile bar that are most frequently used, or that are of the greatest importance to the user, for example. To the extent a user may make changes, additions, or deletions to the icons in the tile bar, such changes may be made, for example, by a "drag and drop" methodology, whereby a user may select an icon, desired for inclusion on the tile bar or desired for removal from the tile bar, and may drag and drop the icon to or from a window or the desktop.

Figure 3:
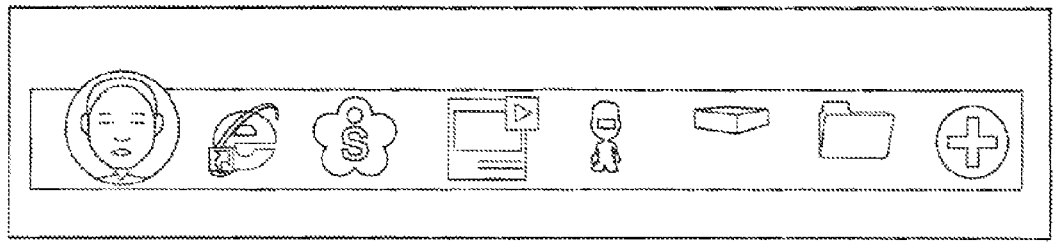
FIG. 3 is an illustration of an aspect of the present invention.
Figure 4:
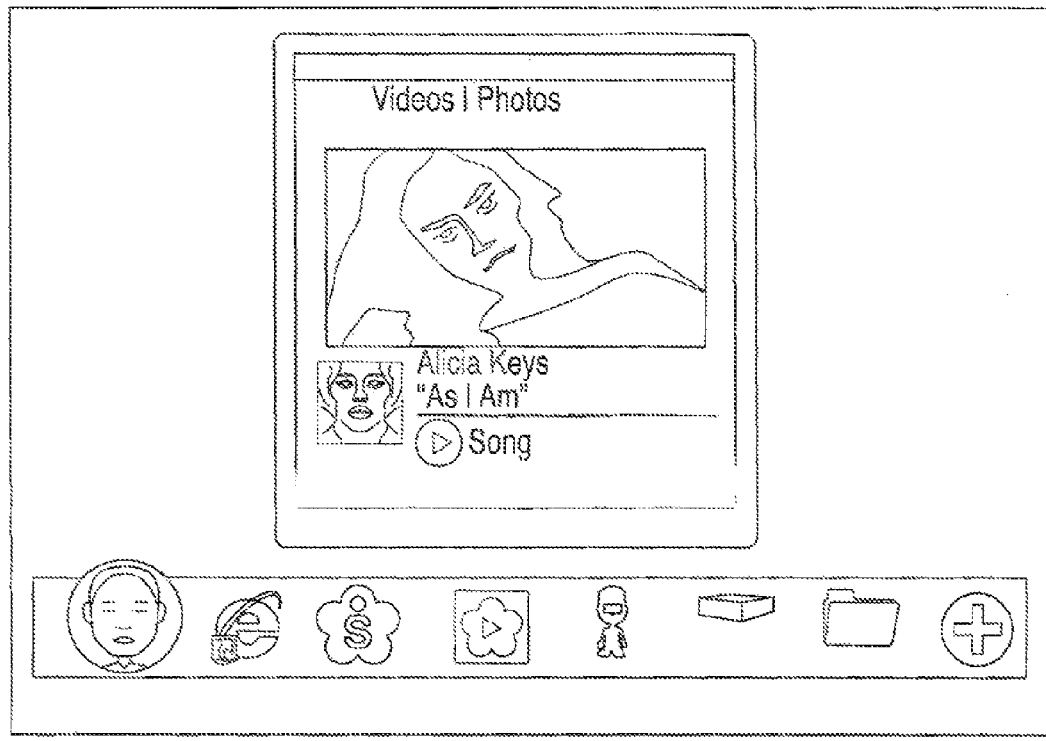
FIG. 4 is an illustration of an aspect of the present invention.

As discussed, the icons on the tile bar may represent, for example, applications, windows, documents, tasks, utilities, files, links (such as a uniform resource locator, or URL, such as for use with http), data, user preferences, shortcuts (such as to desktop or OS applications), user identification, minimized elements, audio and/or video, and the like, as illustrated, for example, in FIGS. 3 and 4. The icons may be linked to the items represented, such as to enable launch of the item from the tile bar, such as by shortcut linking or the like. Further, the tile bar may be presented upon bootup, although, in preferred embodiments, the presentation of the tile bar does not negatively affect boot time. Further, updates to the tile bar may load with each bootup, or may be received via a networked connection, in real time, during use of the GUI.

Figure 5:
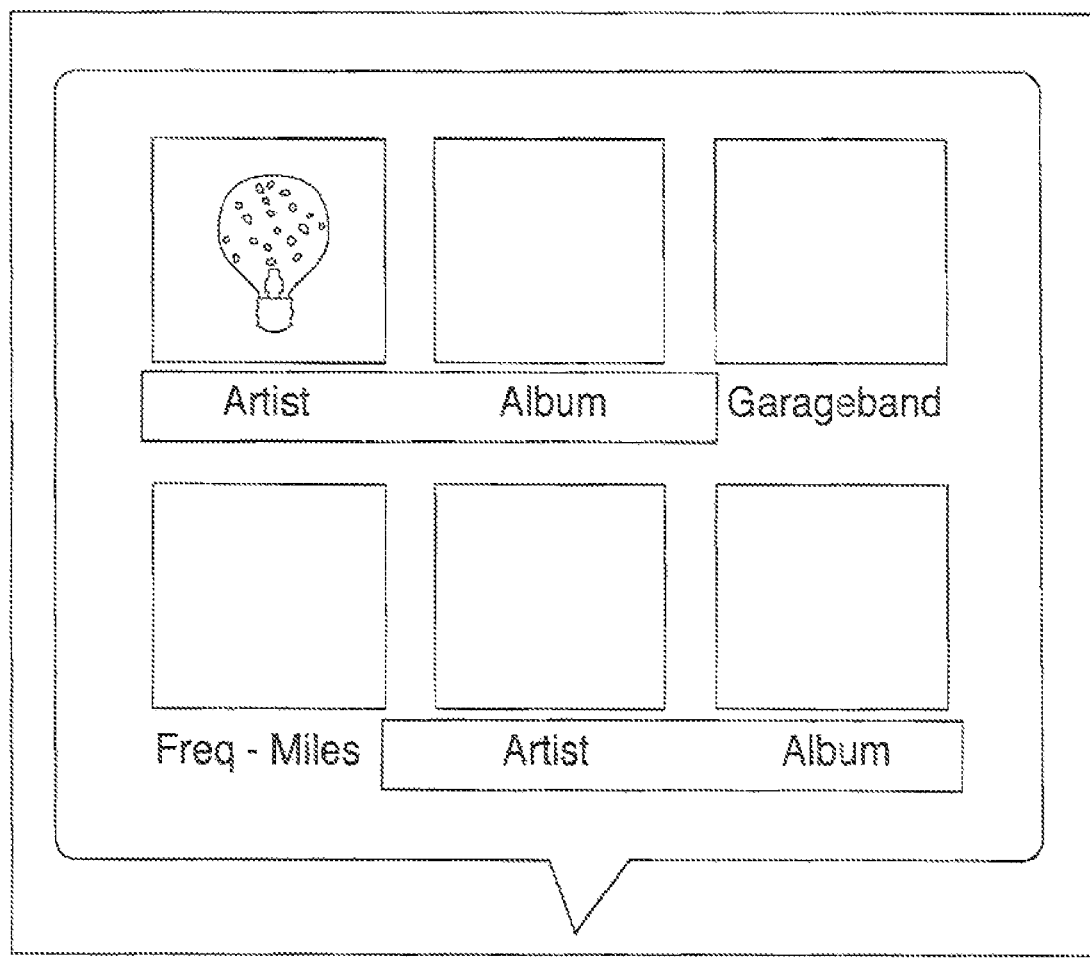
FIG. 5 is an illustration of an aspect of the present invention.

Additionally, for example, placement of the cursor over an icon in the tile bar may provide for a previewing, or monitoring, feature for those items represented by the icon, such as by a miniaturized presentation of the item correspondent to the icon when the cursor is placed over the icon, such as is shown in FIG. 5. Additionally and alternatively, the miniaturized presentation may be made, such as in an arrowed thought bubble, for example, of the item correspondent to the location of the cursor, while a smaller preview of icons proximate to the icon over which the cursor is placed may also be provided, such as a text bubble or informational bubble indicative of the item correspondent to an icon. The present invention may additionally provide such previews of, for example, linked locations or remote applications, due, in part, to the presence of the present invention in the single application layer, and/or in a parallel environment, as discussed with regard to certain exemplary embodiments referenced hereinbelow. Additionally and alternatively, certain applications, links and the like may launch in the preview window upon a simple cursor rollover, such as without need of "clicking" to activate the desired functionality.

Figure 6:
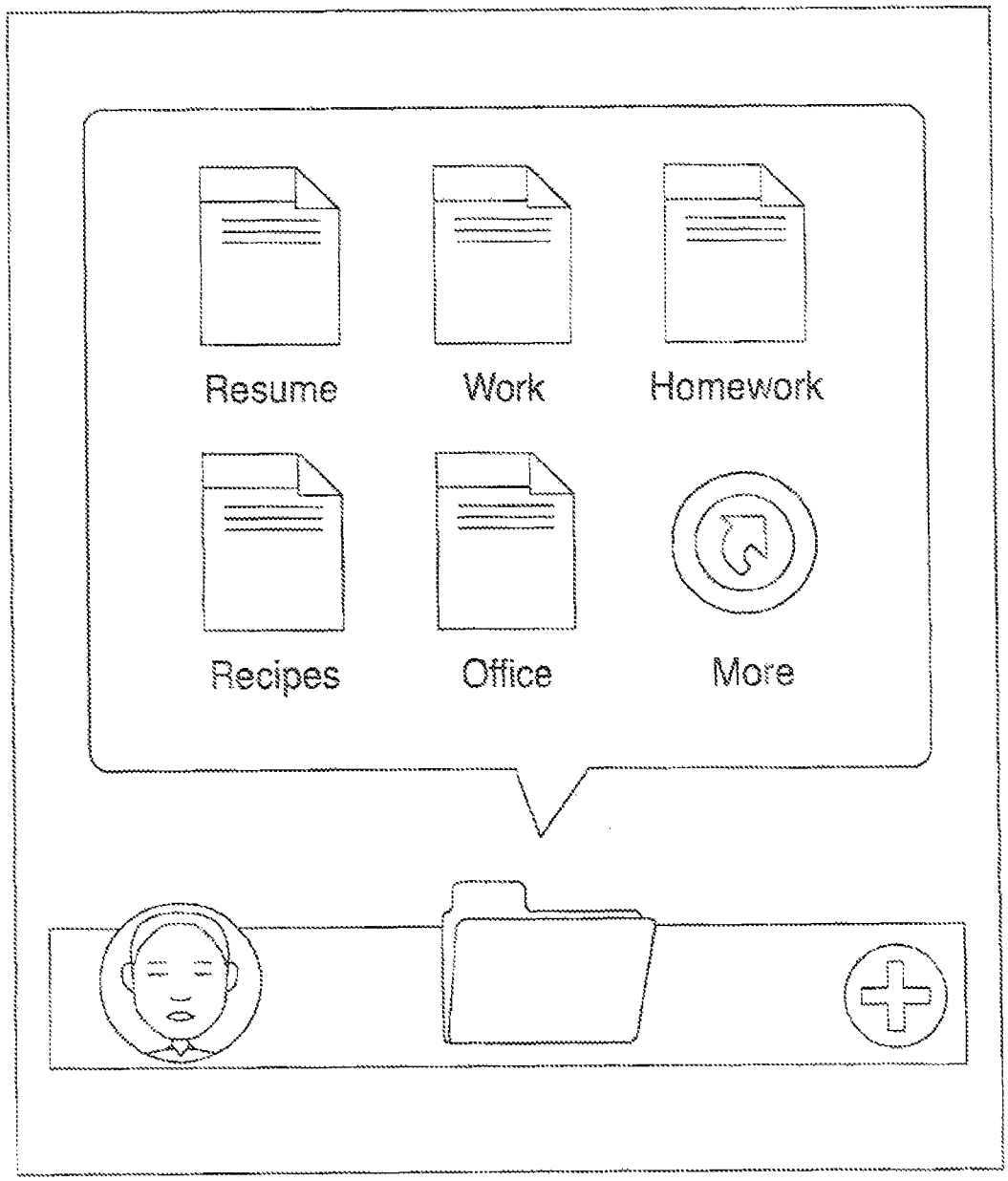
FIG. 6 is an illustration of an aspect of the present invention.
Figure 7:
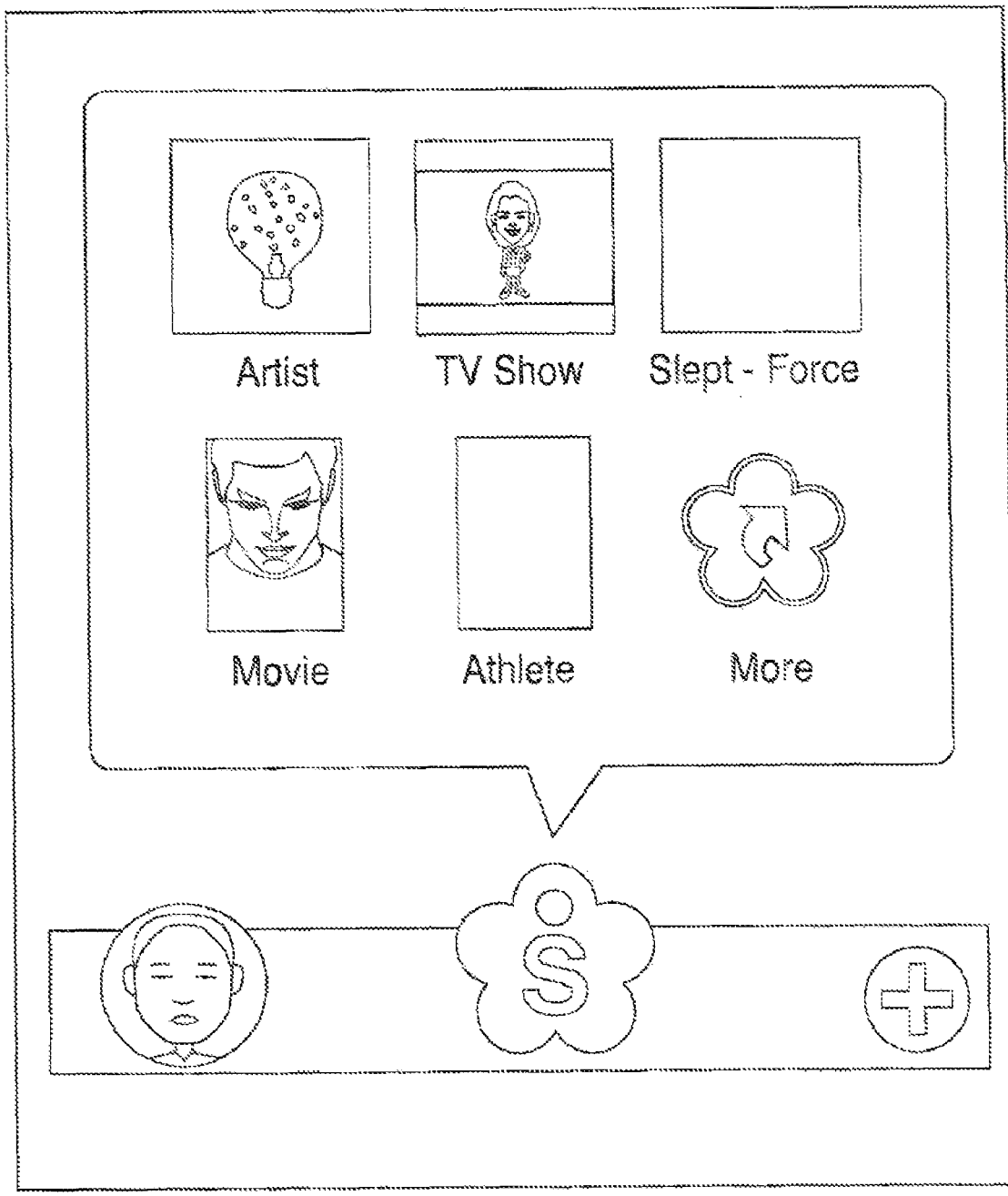
FIG. 7 is an illustration of an aspect of the present invention.
Figure 8:
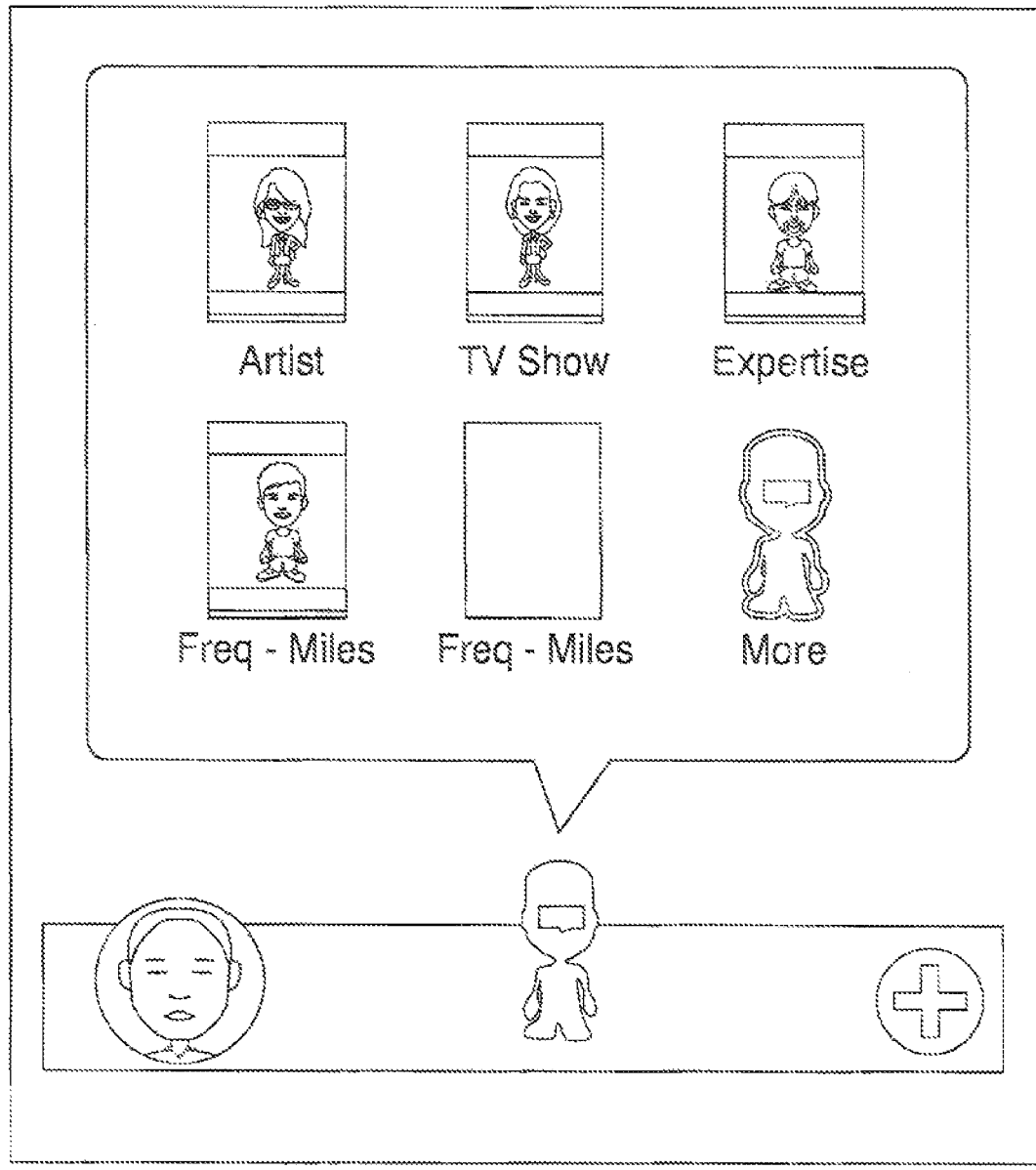
FIG. 8 is an illustration of an aspect of the present invention.

Such previews may additionally include content previews. For example, as illustrated in FIGS. 6-8, to the extent, for example, a folder icon is placed on the tile bar, a preview upon cursor placement may show the content of the folder related to the icon, and/or may show thumbnail, or similar previews, of the content, or of the content of the content indicative icons within the preview. Similarly, a preview may include "favorites," such as a link, application, remote application, search, or search engine icon presenting, upon cursor placement, a listing or thumbnail preview, of favorites correspondent to the link, application, remote application, or the search or search engine. Similarly, in an exemplary embodiment, a mini-application window, such as to launch an application or preview an application, may be evident above selected icons. For example, when the cursor is placed proximate to an icon, such a mini-application window may open, as discussed hereinabove.

The tile bar may be implemented in any number of embodiments in accordance with the present invention. For example, the embodiment most typically known to those skilled in the art for the tile bar is a single horizontal row of icons, but the tile bar may also be a vertical row, or, for example, a box, rectangle, or the like, of multiple rows, presented either vertically or horizontally. Further, although a single row is most typical, contrary to the prior art each icon may not be placed into a row (or rows) on the same scale. For example, those icons placed on the tile bar by the user may be larger, or smaller, in scale than those placed by the OS. Similarly, those icons correspondent to items most frequently used by the user may be larger than other icons on the tile bar. Further, for example, certain icons may not be, or may not only be, of different scale, but additionally may pulse, glow, be backlit, or experience variations in coloration or color vividness, based on frequency of use, user-elected importance, type of item associated with the icon (be it file, application, document, data, folder, window, link, etc.), or like factors.

Additionally, of course, those skilled in the art will appreciate that the tile bar of the present invention may also provide an indication of use, or non-use, of certain items, such as by making changes in the appearance of the corresponding icons, or the background of those corresponding icons, and/or by providing indicators above, below, or otherwise in conjunction with, each icon correspondent to an element actively in use. Likewise, changes in status in items corresponding to the icons in the tile bar may be similarly indicated, such as wherein a number of new emails is superimposed over an email application icon in the tile bar, or a last edit date is superimposed over a word, processing document icon in the tile bar. Such status indicators may be present at all times for certain icons in the tile bar, or may be presented only when the cursor moves over the icon, for example.

As a user moves the cursor across the tile bar, effects may be generated to alert the user as to which icon or icons the user is proximate to. For example, the icon over which the cursor is placed in a tile bar may enlarge, along with the immediately adjacent icons, or the icon over which the cursor is placed may fade in while adjacent icons fade out. In the present invention, the cursor indicator may change when placed over the tile bar, such as the cursor graphically becoming, for example, a magnifying glass, whereby icons are magnified in the center of the magnifying glass graphic when the magnifying glass cursor is placed thereover.

Alternatively, while the icon over which the cursor is present may enlarge, and, additionally or alternatively the immediately adjacent icons may shrink. Alternatively, the color of the icon over which the cursor is placed may become more vivid, and additionally or alternatively the adjacent icons may become less vivid in color, or may turn grey in color, for example. Alternatively, adjacent icons may become blurry. Alternatively, adjacent icons may become "active," such as by beginning to spin, or rotate, around on a center axis or center point, for example. In such an embodiment, icons farther from the icon over which the cursor is placed may spin faster, or slower, than immediately adjacent icons. Alternatively, the icon over which the cursor is placed may increase in size, such that it overlaps or substantially obscures the adjacent icons.

Figure 9:
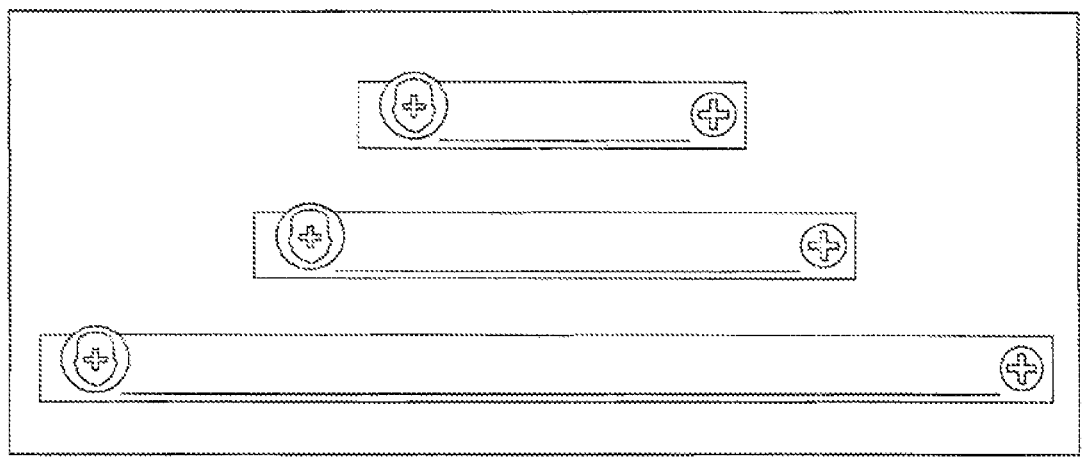
FIG. 9 is an illustration of an aspect of the present invention.
Figure 10:
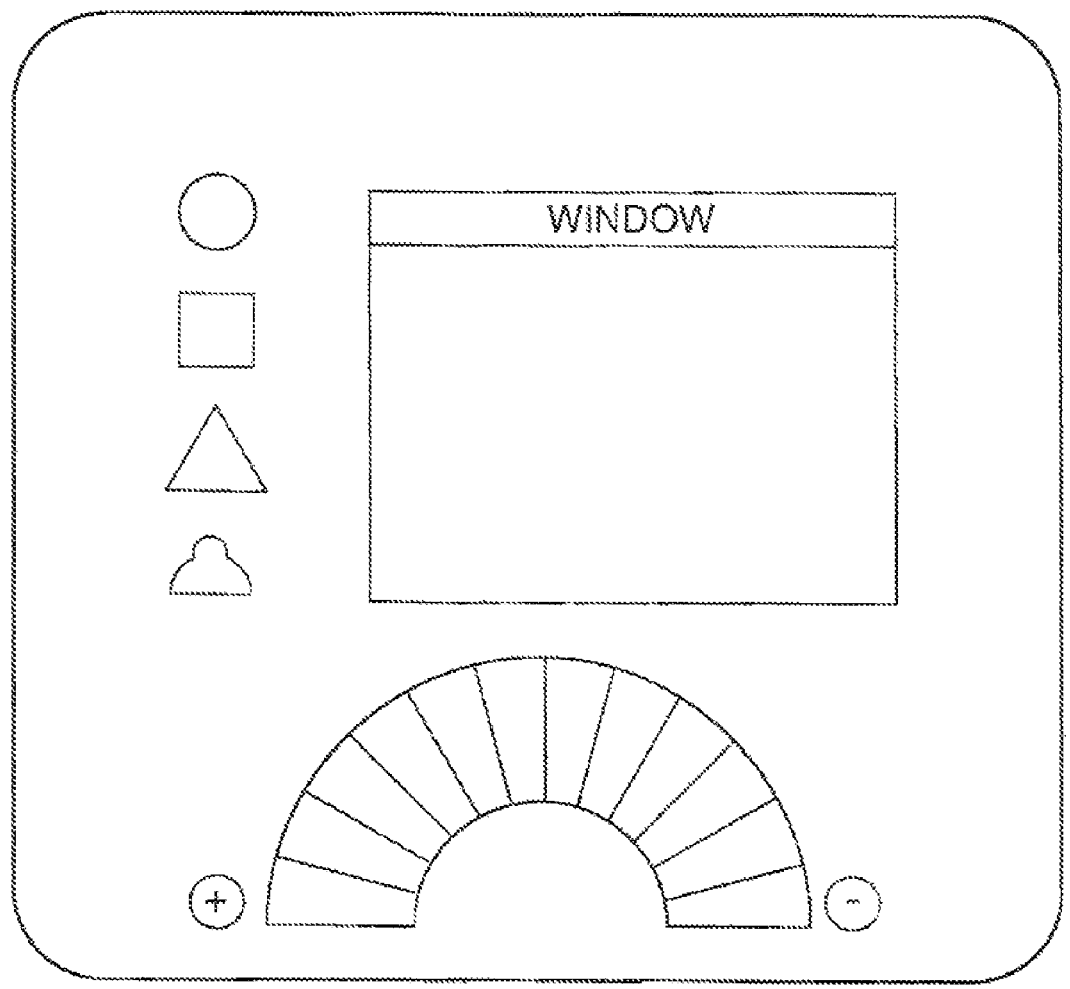
FIG. 10 is an illustration of an aspect of the present invention.

Further, icons on the dock may auto-adjust, such as by reducing space between icons or by making the icons thinner, such as by horizontal width, as new icons are added or removed, or both, for example. Likewise, the size of the tile bar may adjust, such as when icons are added or removed, as shown in FIG. 9. Further, for example, icons may experience a "fan effect" to enable accommodation of additional icons. In such an embodiment, the tile bar may provide that the icons vary in horizontal width from the top to bottom portion of the tile bar, and, in fact, the tile bar may, for example, become progressively more raised along its center to provide the fan effect as more icons are added, such as is illustrated in FIG. 10.

Alternatively, as will be appreciated by those skilled in the art, the tile bar may be implemented using file system objects rather than merely icons. Also in an alternative embodiment, the tile bar may be implemented to represent applications native to the subject OS, or applications foreign, or non-native, to the OS. Such embodiments may be understood with reference to a simplified explanation of the seven established layers in the Open Systems Interconnection ("OSI") model.

In the OSI telecommunication model, the seven layers are divided into two groups. The upper four layers are used to pass messages from or to a user. The lower three layers (up to the network layer) are used for messages passing through the host computer. More specifically, layer 7 is the application layer, at which communication partners are identified, quality of service is identified, user authentication and privacy occurs, and any constraints on data syntax are identified. Layer 7 does not typically include the application itself. Layer 6 is the presentation (syntax) layer, and is usually part of an operating system. Layer 6 converts incoming and outgoing data from one presentation format to another, such as converting a text stream into a popup window populated with the newly arrived text. Layer 5, the session layer, sets up, coordinates, and terminates conversations, exchanges, and dialogs. Layer 4 is the transport layer, which manages the end-to-end control for complete data transfer, and for error-checking. Layer 3, the network layer, routes and forwards data. Layer 2, the data-link layer, provides synchronization for the physical level, transmission protocol and management. Layer 1 is the physical layer, which conveys the bit stream through the network at the electrical and mechanical level using hardware.

As discussed, OS functions are typically performed in Layer 6. As such, in typical tile bars, the functionality is provided in Layer 6, with certain elements in Layer 7. However, this causes the use of "native" OS applications, that is, those applications that communicate most readily with the OS, in a typical tile bar. Further, at minimum, interaction by the tile bar occurs most readily with applications, and items represented by icons, that are most compatible with, and thus, typically natively developed for, within, or by developers associated with, the OS. In typical solutions for acceptance of foreign, or non-native, applications into a tile bar, a "wrapper application," i.e. a translation or normalization application to normalize the foreign applications for use with the OS, is provided.

However, although the present invention may be implemented Within, or in association with, a particular OS, the present invention may also be implemented in a "single application layer," that is, the layer above the application layer, which is the layer in which discrete applications reside. Thus, the tile bar may be provided in a layer above the typical OS layer, but nonetheless within the same operating environment. Thereby, the present invention may simplistically be interoperable with both native and non-native applications and items represented by icons, in part because, as a non-native element resident in the single application layer, the tile bar of the present invention is, itself, already normalizing to obtain interoperability with the OS. Further, an additional advantage of the non-native status of the tile bar of the instant invention is that it may offer functionality not typically available in a tile bar provided within an OS, such as by making itself available as a third party-application to third party developers, by making non-bundled digital content visible in the layer with the OS, by making available opportunities not presently available to OS providers due to bundling limitations, as well as by making available advertising opportunities.

Figure 11:
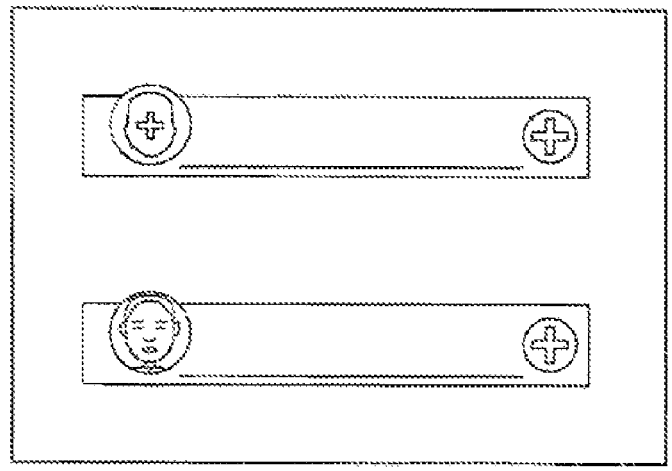
FIG. 11 is an illustration of an aspect of the present invention.

For example, in native or non-native embodiments of the present invention, an advertisement system may be provided. For example, because the tile bar of the present invention may include, as an element, or may be based upon, a personal identification unit, the present invention may allow for the presentation of targeted advertising. Such a personal identification unit may include, for example, an avatar, or more specifically an icon, such as an icon representing an avatar, which icon or avatar may have associated therewith a myriad of personal information, such as name, status, age, profession, interests, personal widgets, and the like, as well as a myriad of log-in and/or site-associated information, such as log-ins, site preferences, memberships, contacts, files, and the like, such as is illustrated in FIG. 11. This information related to the user may be different with respect to the tile bar dependent upon which user is logged into the OS at any given time. Further, for example, this personalization may allow for portability of the tile bar, and/or of a personal profile related to the tile bar of the present invention, such as by, for example, a network download to any computer on which that user resides. Such portability may be provided via drag and drop, and/or widgetization, and/or development as a resident of the single application layer, and/or via other methodologies as will be apparent to those skilled in the art, for example.

Figure 12:
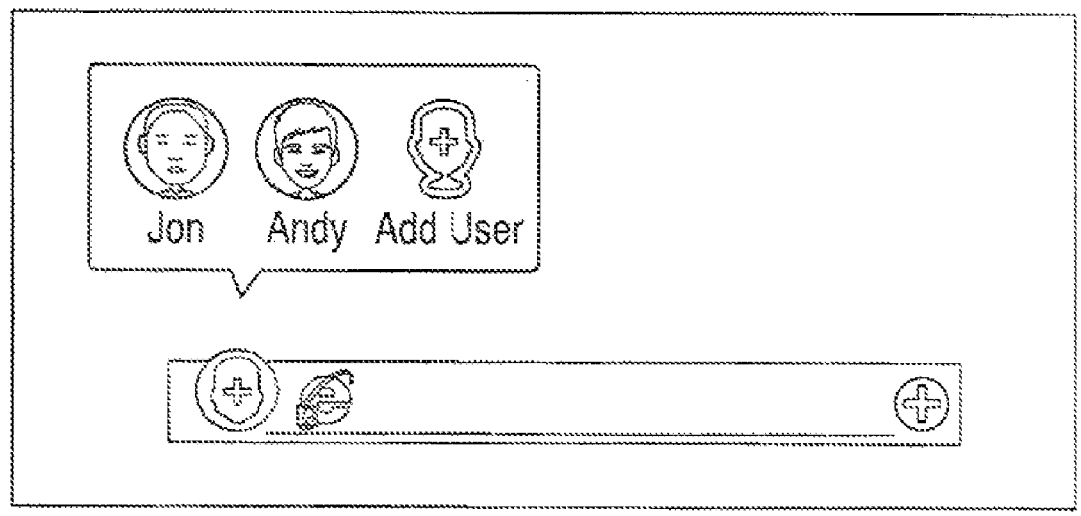
FIG. 12 is an illustration of an aspect of the present invention.
Figure 13:
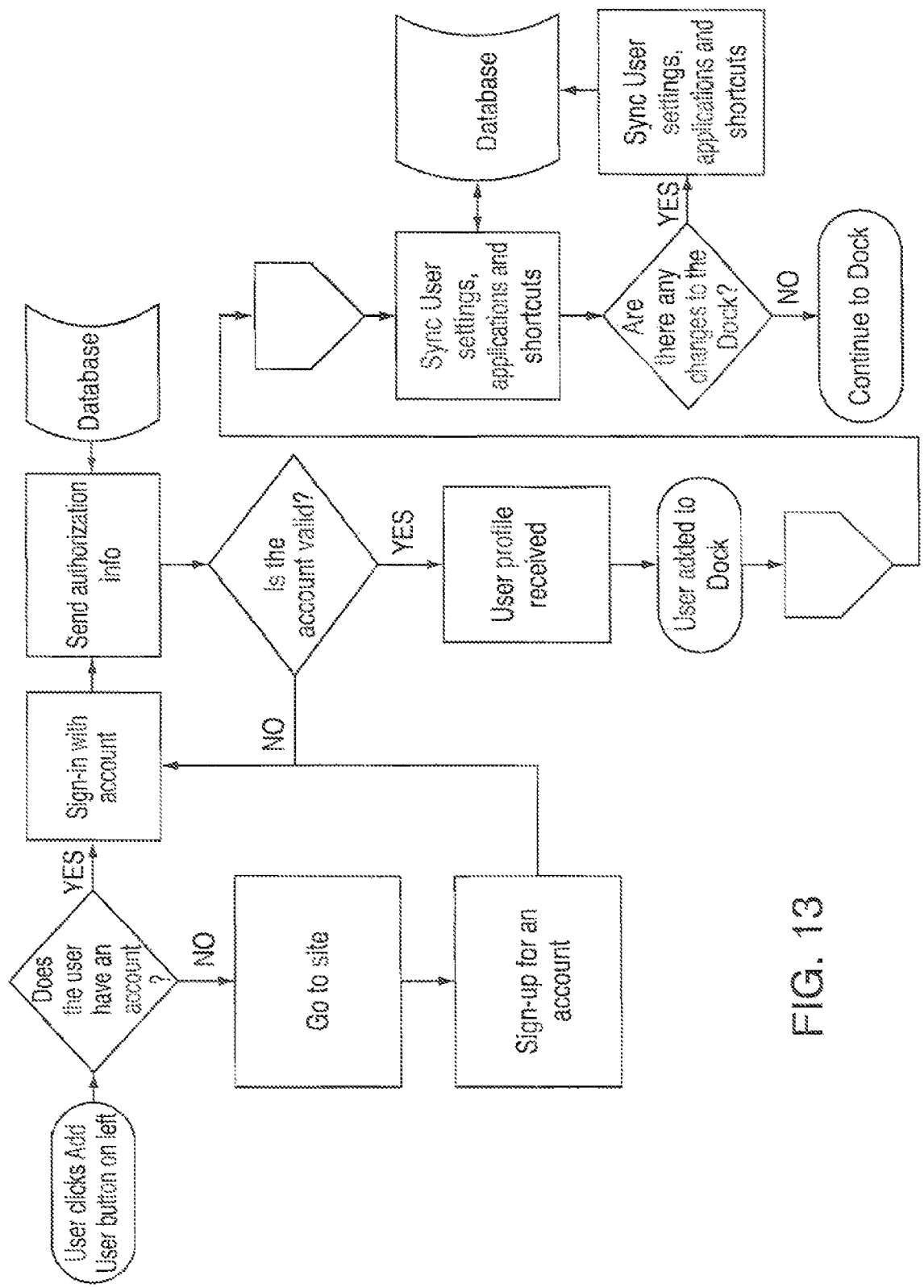
FIG. 13 is an illustration of an aspect of the present invention.
Figure 14:
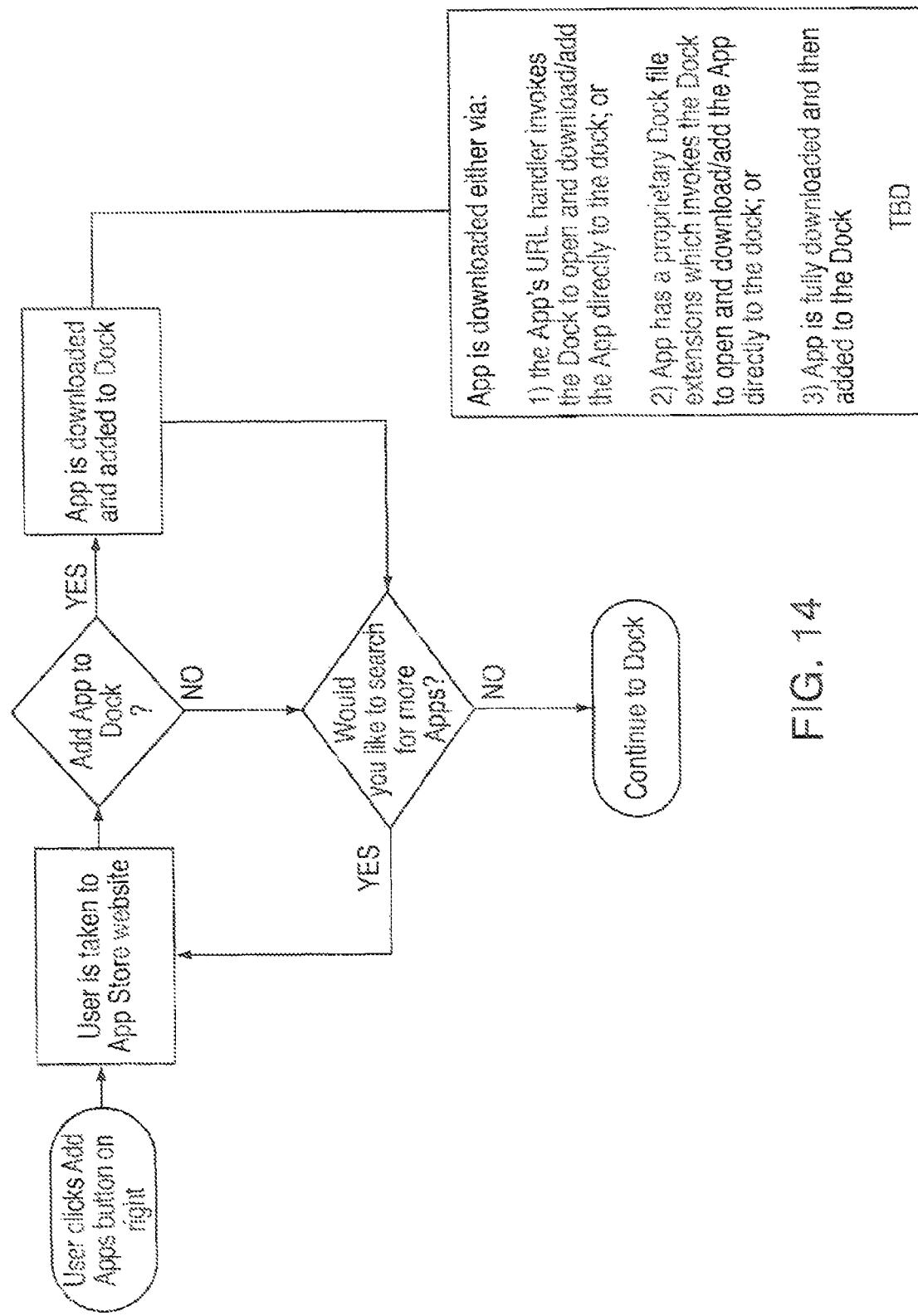
FIG. 14 is an illustration of an aspect of the present invention.
Figure 15A:
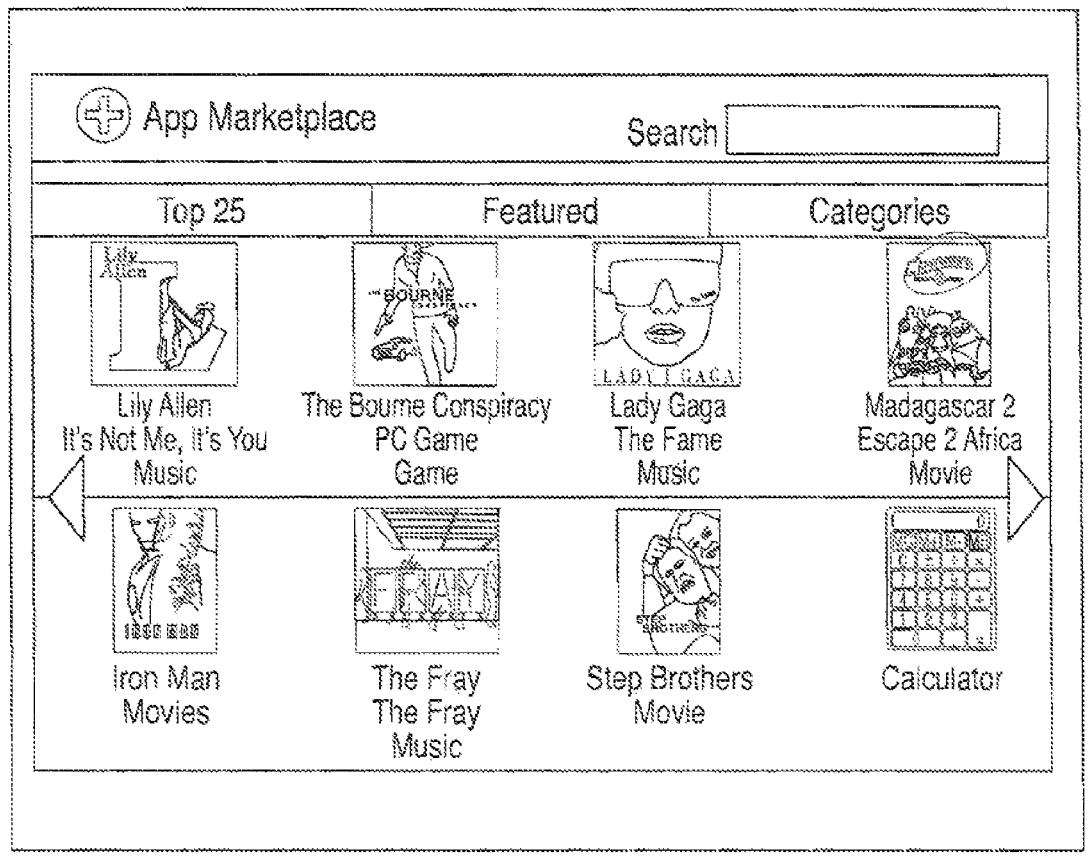
FIGS. 15A-D are illustrations of aspects of the present invention.
Figure 15B:
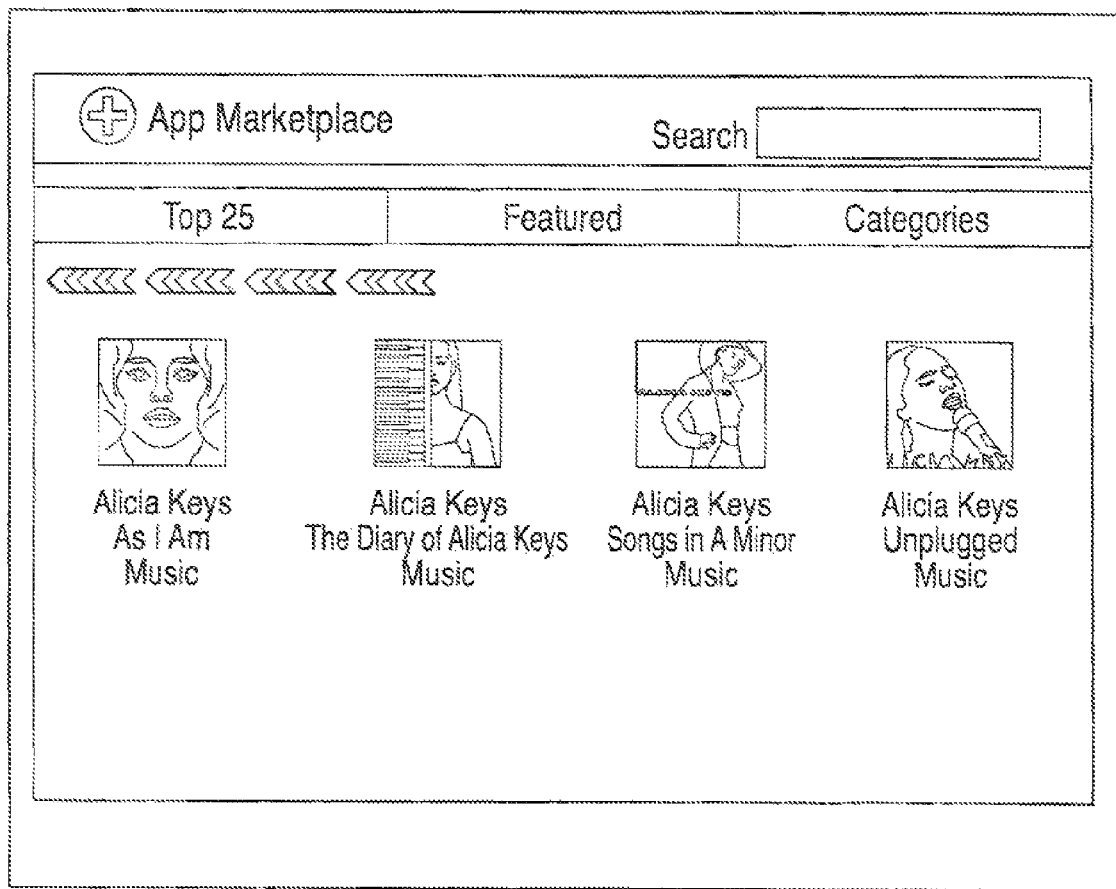
Figure 15C:
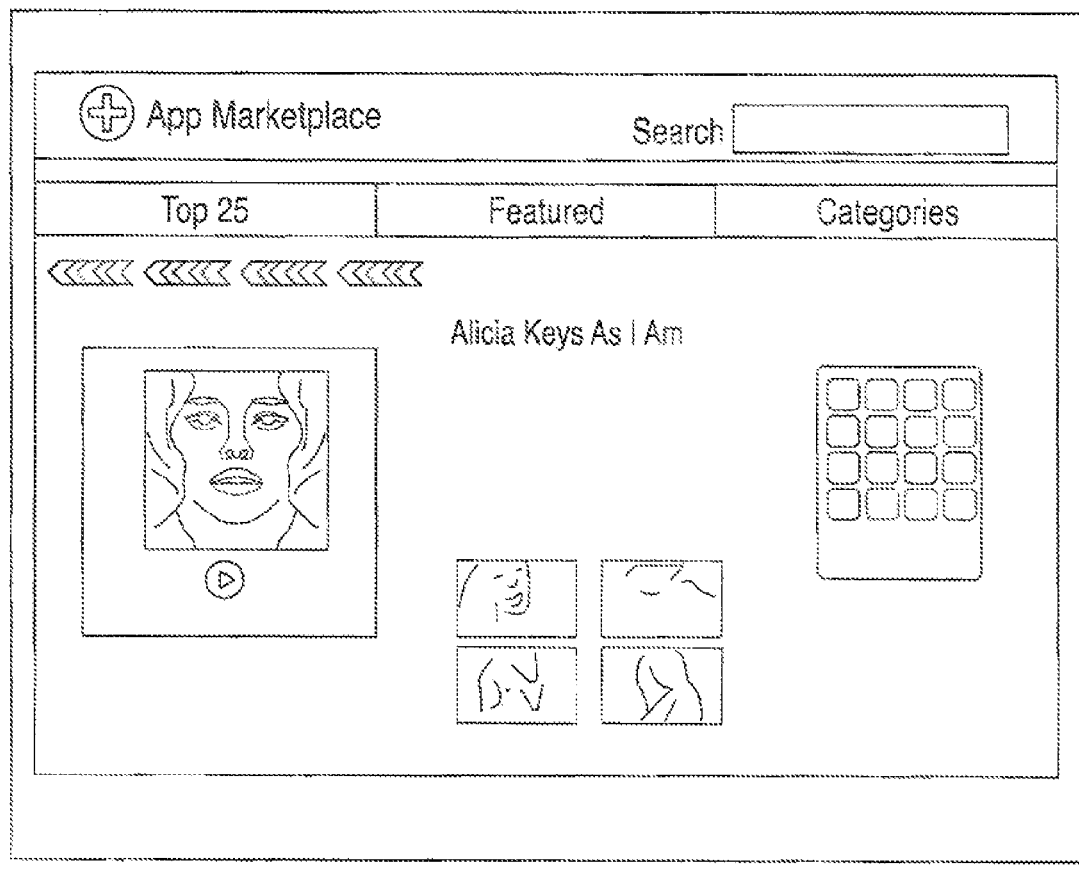
Figure 15D:
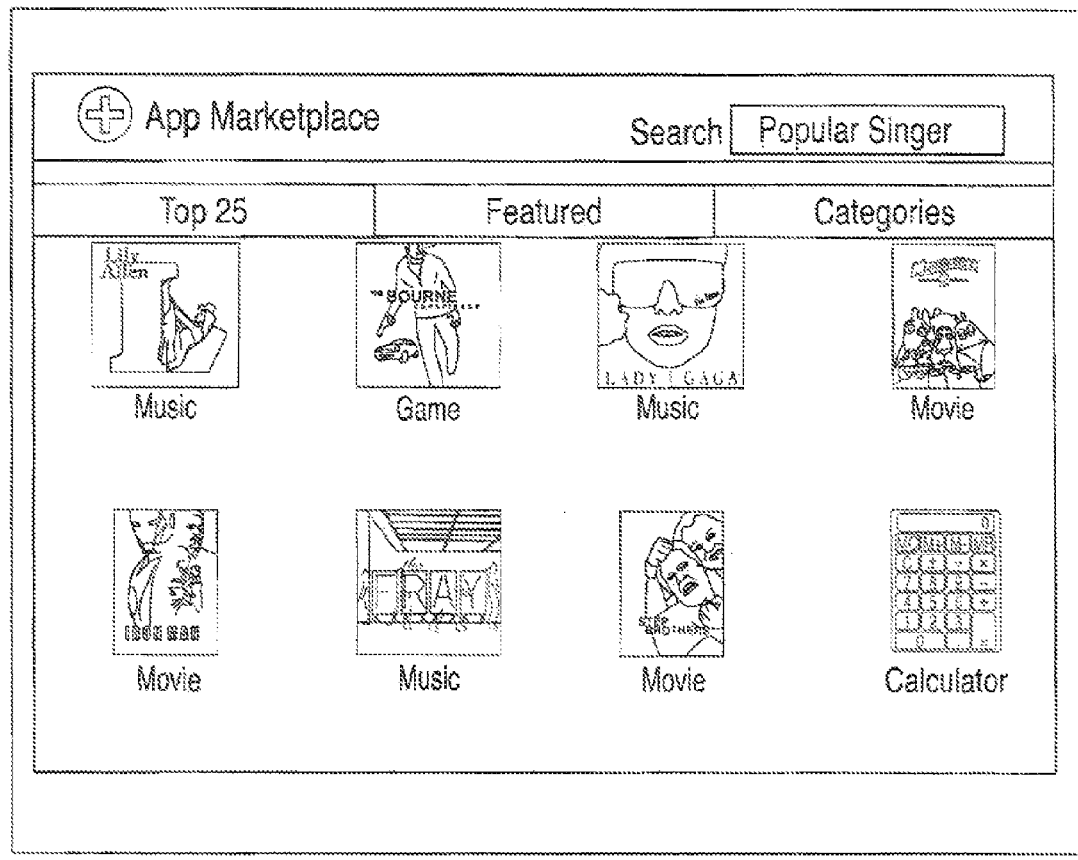

Thus, for example, an icon, avatar or similar uniquely user-identifiable representation may be associated with each user of, for example, a shared computer, and the built-in identification of the tile bar may switch as the logged-in user of the computer switches, as illustrated in FIG. 12. Thereby, for example, icons in the tile bar may provide unique, shortcut links to accounts of the respective logged-in user, such as on social networks, auction sites, purchasing sites, and/or informational sites, such as is illustrated in FIG. 13. Further, unique "apps," such as from an "app store" may be selected by each user for inclusion on the respective user's tile bar. Thereby, for example, the present invention may provide access to an app store in which third party developers may provide apps for users of the tile bar via an open API for the tile bar. Aspects of such an app store embodiment are illustrated in FIGS. 14 and 15A-D. Similarly, apps may be pushed, or suggested, based on an individual user's use or preferences, which may be individual to each user with regard to the tile bar as discussed hereinthroughout.

Thus, by way of example, a user profile-based operating system may be provided in accordance with the present invention on a mobile device, such as a mobile pad. The processing required of the operating system, the applications provided therewith, any application store provided therewith, and the recommendation engine discussed herein, may preferably be minimized for improved operation on a portable device. The applications, application store, recommendation engine, and profile based operation discussed herein may preferably be provided in accordance with the operating systems discussed herein, or with any other operating system, such as those provided by Google, Apple, Palm, Blackberry or the like.

More particularly, the mobile device discussed herein may include, for example, mail, contacts, gaming and other aspects discussed herein specifically with respect to a particular profile, such as the profile of a child. In a preferred embodiment, the mail, friends, and similar applications may be applications originally designed for use with Flash player, for example. However, in the present invention, a virtual machine may be provided in the network with which the mobile device is used, such as within the internet cloud, and sites indicated as accessible in accordance with the profile of the user may be mirrored on the virtual machine. More particularly, the mirrored sights that are to be accessible may be mirrored on the virtual machine with the Flash aspects removed, and thereby the applications may be delivered, and/or the sites may be delivered, to the mobile device without the Flash aspects. Although this may modify the content initially provided by providers of the sites, it will also drive significant numbers of new impressions to the sites.

In an additional example, search capabilities may be made available from the tile bar, and thus may be made available in accordance uniquely with user-related information. For example, a search tool may be widgetized and associated with the tool bar. Whether or not the search tool is placed in the tile bar and/or associated with the user-related information, in embodiments wherein the tile bar is non-native, and hence third-party, to the OS, it is highly likely that any typical OS bundling issues may be avoided. Thus, in this and other exemplary embodiments, the tile bar of the present invention may publish directly to the OS, and yet avoid bundling issues.

Figure 16:
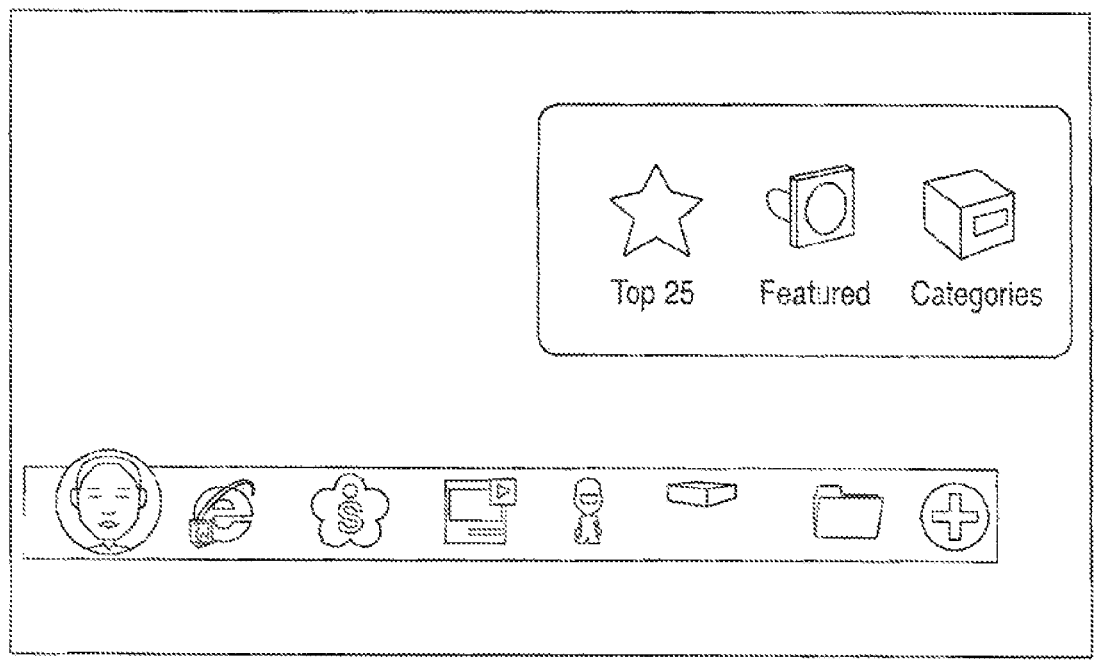
FIG. 16 is an illustration of an aspect of the present invention.

The presence of user-related information may allow, for example, for the presence and/or launch of embedded advertising, content discovery based upon content consumption and usage for the individual user, or similar recommended content, in, from, or in association with, the tile bar, as illustrated in FIG. 16. Similarly, a recommendation engine may be included in, from, or in association with, the tile bar, wherein the recommendation engine provides recommendations based on the user-related information. In exemplary embodiments, a user preference for classic cars may allow for a launch from the tile bar, such as in a banner, an arrowed "thought box," or the like, of an advertisement related to an auto-parts store specializing in classic car parts. Further, for example, the tile bar may use eBay preference and log-in information to alert the user of the presence of a desired, classic used car, and/or in a desired price range, and, to the extent the user clicks, for example, an eBay "thought box" recommending purchase of the car, the user may be taken directly to eBay, and logged in, based on the user-related information in the tile bar, to the auction relating to the recommended car.

Figure 17:
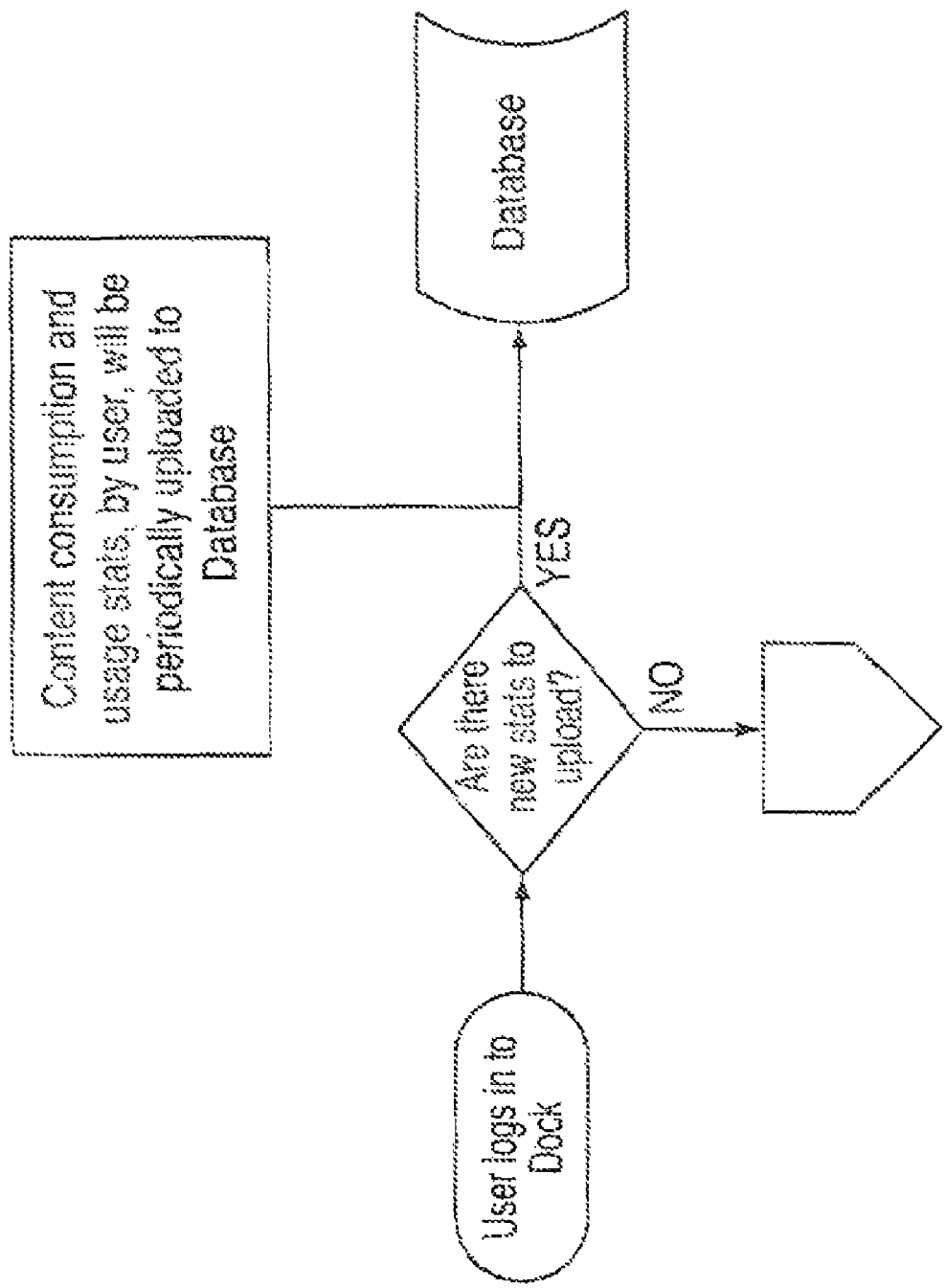
FIG. 17 is an illustration of an aspect of the present invention.
Figure 18:
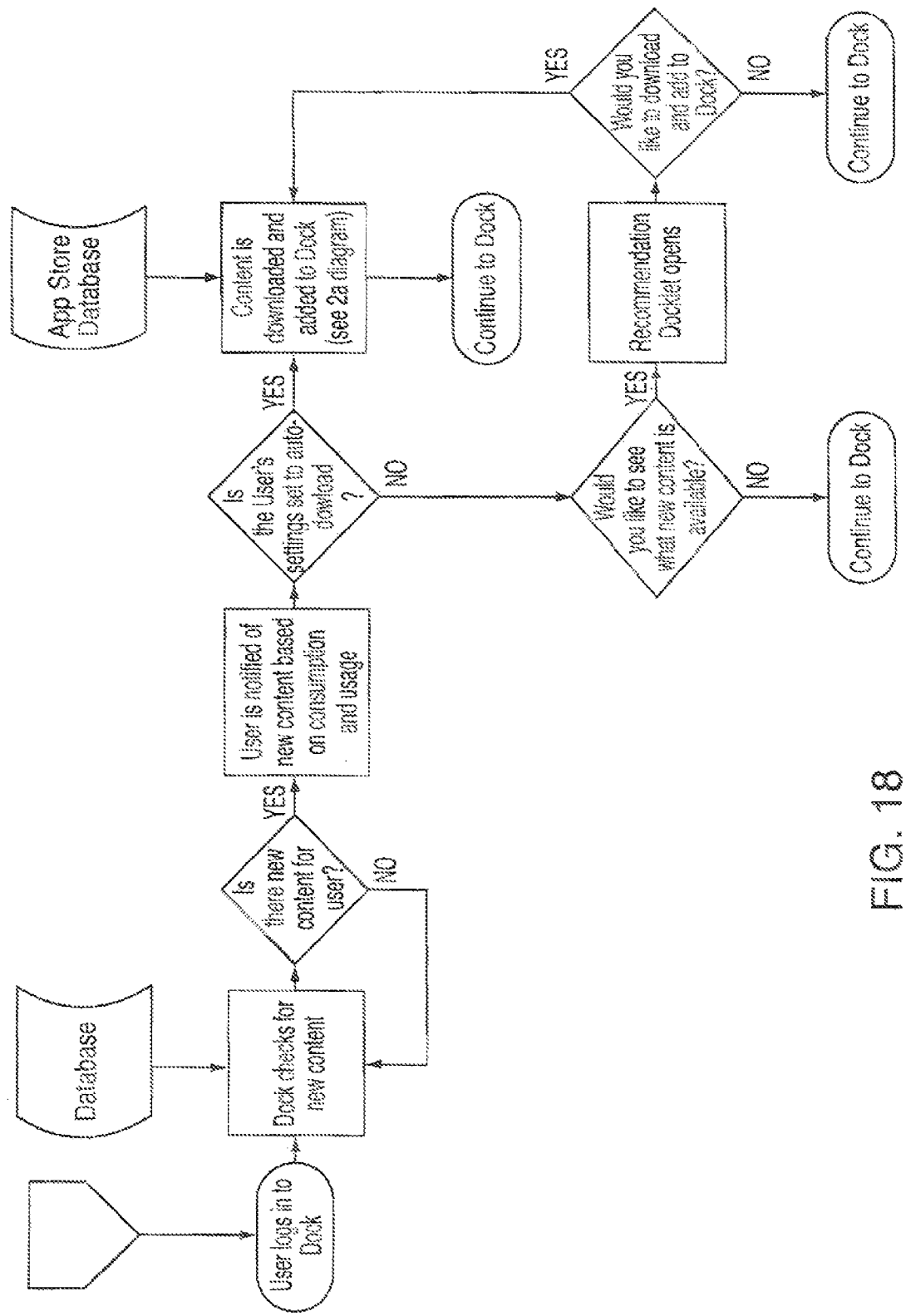
FIG. 18 is an illustration of an aspect of the present invention.

Likewise, shortcuts, applications, links, or the like may be suggested based on an individual user's usage as monitored, tracked, and/or stored by the tile bar. Alternatively, upgrades to the computing environment may be recommended, or pushed. Additionally, cloud computing services may be suggested. Other computing elements of interest to the user, such as widgets or content, may likewise be suggested or pushed. Content discovery and recommendation, such as that based on consumption and usage, may occur as illustrated in the exemplary embodiment of FIGS. 17-18.

In other words, placement of advertising, and/or recommendations, may occur in a manner similar to a "Trojan horse." A Trojan horse is understood in the art to be a malevolent instance masquerading as a benevolent instance, typically entering a user's computing environment, for example, in apparently benevolent form, and often with the user's permission, only to later undertake malevolent action. The term comes from the Trojan War, in which the Greeks gave a peace offering in the form of a giant wooden horse to the Trojans, and, after the Trojans took the horse inside the walls of Troy, Greek soldiers exited from the hollow belly of the horse to allow their fellow Greek soldiers into Troy. Although conceptually similar, the advertising associated with the tile bar of the present invention is in no way malevolent, but rather may be embedded within the tile bar in order to enable the provision of helpful information based uniquely on user-related information. As such, the tile bar itself may be a Trojan horse in that it may popup on boot of the OS, and link the user into e-commerce with an experience uniquely tailored to the individual user based on that user's user-related information. Alternatively and additionally, the embedded elements may relate to, may relate to the automated launch of, or may relate to advertising for services related to, for example, storage or backup.

Additionally, many of the advantages of the present invention may be realized if, for example, the tile bar is presented not only in a layer distinct from the OS, but also as a unique OS-type application in its own right, but with equal and simultaneous visibility via the GUI to the user of the main OS. For example, in computing, a hypervisor, which is sometimes referred to as a virtual machine monitor, is a virtualization platform that allows multiple operating systems to run on a host computer at the same time. For example, a "guest" operating system may run at a second level, or layer, above the computing hardware.

Figure 19:
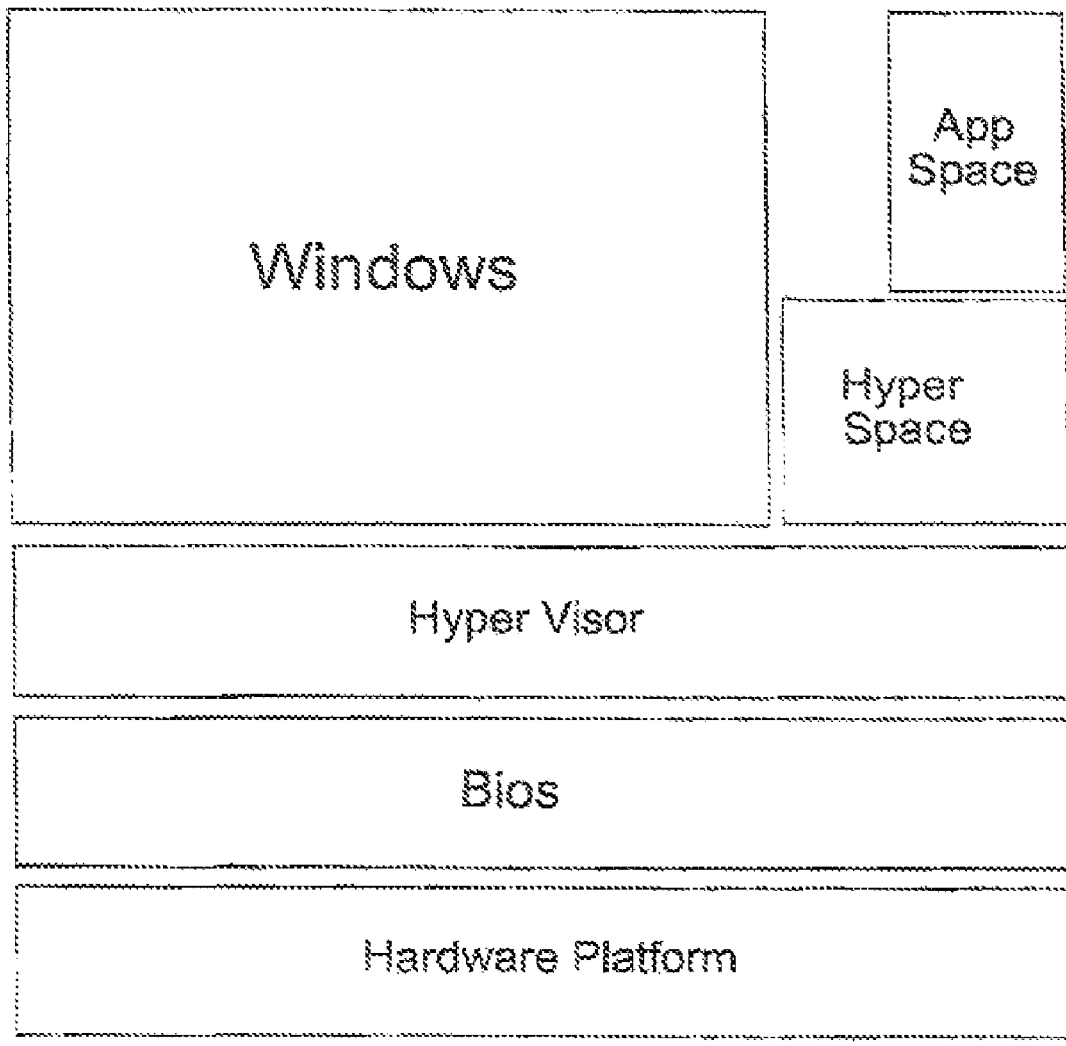
FIG. 19 is an illustration of an aspect of the present invention.

For example, referring now to FIG. 19, there is shown a block diagram illustrating diagrammatically the relationship between the BIOS, a hypervisor according to an aspect of the present invention, an OS, and a second OS-type element presented by one or more operating environment spaces instantiated by the hypervisor. As is generally understood in the pertinent art, BIOS stands for Basic Input/Output System. The hypervisor or like computing element may thus sit above the BIOS, and enable the operation of multiple OS's, and/or the coordination of multiple OS-type applications, or application, actions, and may instruct the BIOS to grant simultaneous hardware access, such as to the display. Of course, in the present invention, the second OS-type element may be a tile bar in accordance with the discussion hereinthroughout, and is most preferably presented graphically simultaneously with the GUI of the main-OS in order to provide a transparent user experience. Further, through the hypervisor, or a like computing element, it is necessary that the tile bar have access and insight into the applications in communication with the main OS, particularly in embodiments in which applications, files, folders, documents, data, and the like native to the main OS are to be available in the tile bar of the present invention.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A mobile user pad device, comprising:
a user profile-based operating system associated with at least one microprocessor, and including at least an application store and an application recommendation engine tailored to the user profile; and
a transceiver having access to a virtual machine, wherein the virtual machine comprises a mirror of at least one site having at least one flash aspect, but with the flash aspect removed, and wherein the transceiver communicatively receives the mirror from the virtual machine responsive to a request from the user profile-based operating system.

2. A mobile device communications system, comprising:
a mobile user pad, comprising:
a user profile-based operating system associated with at least one microprocessor, and including at least an application store and an application recommendation engine tailored to the user profile; and
a transceiver;
at least one communications network; and
a virtual machine resident in said at least one communications network, wherein said virtual machine comprises a mirror of at least one site at a node on said at least one communications network having at least one flash aspect, but with the flash aspect removed, and wherein the transceiver communicatively receives the mirror from said virtual machine responsive to a request from said user profile-based operating system.

3. The system of claim 2, wherein the operating system is provided by one of Google®, Apple®, Palm®, Blackberry®.

* * * * *